(12) United States Patent
Epstein

(10) Patent No.: US 11,373,653 B2
(45) Date of Patent: Jun. 28, 2022

(54) PORTABLE SPEECH RECOGNITION AND ASSISTANCE USING NON-AUDIO OR DISTORTED-AUDIO TECHNIQUES

(71) Applicant: Joseph Alan Epstein, Pleasanton, CA (US)

(72) Inventor: Joseph Alan Epstein, Pleasanton, CA (US)

(*) Notice: Subject to any disclaimer, the term of this patent is extended or adjusted under 35 U.S.C. 154(b) by 154 days.

(21) Appl. No.: 16/746,741

(22) Filed: Jan. 17, 2020

(65) Prior Publication Data

US 2020/0234712 A1 Jul. 23, 2020

Related U.S. Application Data

(60) Provisional application No. 62/794,616, filed on Jan. 19, 2019.

(51) Int. Cl.
| | | |
|---|---|---|
| *G10L 15/25* | (2013.01) | |
| *H04N 5/225* | (2006.01) | |
| *H04R 1/10* | (2006.01) | |
| *G10L 15/22* | (2006.01) | |
| *G10L 15/02* | (2006.01) | |
| *G10L 15/06* | (2013.01) | |
| *H04R 1/08* | (2006.01) | |

(52) U.S. Cl.
CPC .............. *G10L 15/25* (2013.01); *G10L 15/02* (2013.01); *G10L 15/063* (2013.01); *G10L 15/22* (2013.01); *H04N 5/2253* (2013.01); *H04R 1/08* (2013.01); *H04R 1/1041* (2013.01); *G10L 2015/025* (2013.01)

(58) Field of Classification Search
CPC ..... G06T 19/006; G10L 15/02; G10L 15/063; G10L 15/14; G10L 15/22; G10L 15/25; G10L 2015/025; G10L 15/08; G10L 15/16; G10L 15/24; G10L 21/0364; H04M 1/72454; H04N 5/2253; H04N 5/38; H04R 1/08; H04R 1/083; H04R 1/1041; H04R 1/406; H04R 3/005; H04R 3/00; H04R 5/04; H04S 7/303; A61B 5/1123; A61B 5/389; A61B 7/006; G06F 21/32; G06F 40/58; G16H 50/20
USPC .......... 379/93.06; 381/26; 607/48; 704/231, 704/232, 233, 243, 201, 255, 271; 602/16
See application file for complete search history.

(56) References Cited

U.S. PATENT DOCUMENTS

| | | | | |
|---|---|---|---|---|
| 5,737,485 A | * | 4/1998 | Flanagan | ................ G10L 15/16 704/232 |
| 7,082,393 B2 | * | 7/2006 | Lahr | ....................... G10L 15/24 704/E15.041 |
| 8,731,923 B2 | * | 5/2014 | Shu | ........................ G10L 15/02 704/243 |

(Continued)

*Primary Examiner* — Gerald Gauthier

(57) ABSTRACT

A method and system for detecting speech using close sensor applications, according to some embodiments. In some embodiments, a close microphone is applied to detect sounds with higher muscle or bone transmission components. In some embodiments, a close camera is applied that collects visual information and motion that is correlated with the potential phonemes for such positions and motion. In some embodiments, myography is performed, to detect muscle movement. In an earbud form factor embodiment, processing of different channels of close information is performed to improve the accuracy of the recognition.

17 Claims, 8 Drawing Sheets

(56) References Cited

U.S. PATENT DOCUMENTS

| | | | |
|---|---|---|---|
| 9,853,758 B1* | 12/2017 | Channegowda | G10L 15/25 |
| 10,856,070 B2* | 12/2020 | Feldman | H04R 3/00 |
| 11,036,302 B1* | 6/2021 | Berenzweig | G06F 3/017 |
| 2002/0194005 A1* | 12/2002 | Lahr | G10L 15/24 |
| | | | 704/E15.041 |
| 2004/0254617 A1* | 12/2004 | Hemmerling | A61B 7/006 |
| | | | 607/48 |
| 2010/0131268 A1* | 5/2010 | Moeller | G10L 21/0364 |
| | | | 704/233 |
| 2010/0284525 A1* | 11/2010 | Sander | H04R 1/1091 |
| | | | 379/93.06 |
| 2011/0246187 A1* | 10/2011 | Srinivasan | A61B 5/389 |
| | | | 704/201 |
| 2012/0284022 A1* | 11/2012 | Konchitsky | G10L 15/24 |
| | | | 704/231 |
| 2014/0050326 A1* | 2/2014 | Vesa | H04R 5/04 |
| | | | 381/26 |
| 2016/0027441 A1* | 1/2016 | Liu | G10L 15/08 |
| | | | 704/255 |
| 2016/0241975 A1* | 8/2016 | Jensen | H04R 3/005 |
| 2017/0103775 A1* | 4/2017 | Xu | H04R 3/005 |
| 2018/0098146 A1* | 4/2018 | Lin | H04R 1/1083 |
| 2018/0240353 A1* | 8/2018 | Bhuttar | G16H 10/20 |
| 2018/0307314 A1* | 10/2018 | Connor | A61B 5/1123 |
| 2018/0310114 A1* | 10/2018 | Eronen | H04R 1/406 |
| 2018/0338213 A1* | 11/2018 | Lehtiniemi | H04S 7/303 |
| 2019/0052977 A1* | 2/2019 | Hannemann | H04R 3/00 |
| 2019/0142618 A1* | 5/2019 | Hyung | G16H 50/20 |
| | | | 602/16 |
| 2019/0294769 A1* | 9/2019 | Lesso | H04R 1/1041 |
| 2020/0037076 A1* | 1/2020 | Boulanger | H04R 1/1041 |
| 2020/0194028 A1* | 6/2020 | Lipman | G06F 40/58 |
| 2020/0234712 A1* | 7/2020 | Epstein | G10L 15/02 |
| 2020/0296521 A1* | 9/2020 | Wexler | H04N 5/38 |
| 2021/0076982 A1* | 3/2021 | Sarkela | A61B 5/746 |
| 2021/0160624 A1* | 5/2021 | Wexler | H04R 25/65 |
| 2021/0160625 A1* | 5/2021 | Wexler | H04N 5/38 |
| 2021/0168516 A1* | 6/2021 | Wexler | G10L 21/0272 |
| 2021/0233539 A1* | 7/2021 | Wexler | G06F 3/167 |
| 2021/0235201 A1* | 7/2021 | Wexler | G06V 20/10 |
| 2021/0235207 A1* | 7/2021 | Wexler | G10L 21/003 |
| 2021/0258703 A1* | 8/2021 | Wexler | G06V 40/171 |
| 2022/0021988 A1* | 1/2022 | Wexler | G06F 1/163 |

* cited by examiner

PORTABLE SPEECH RECOGNITION AND ASSISTANCE USING NON-AUDIO OR DISTORTED-AUDIO TECHNIQUES

CROSS REFERENCE TO RELATED APPLICATION

This application claims the benefit of provisional patent application Ser. No. 62/794,616, filed Jan. 19, 2019 by the present inventor, the entire content of which is hereby incorporated by reference.

BACKGROUND OF THE INVENTION

1. Field of the Invention

The present invention relates to the field of detecting speech using wearable, head mounted, or closely placed devices to allow for operation where clean direct audio recording may be difficult.

2. Description of the Prior Art

In many circumstances there is no alternative to speech recognition: for driving, when laws prevent typing; when a person's hands are full; when using a smart speaker such as an Alexa-powered Amazon Echo; or simply to take notes during a live discussion, speech recognition allows people to get things done. Sometimes the speech is transcribed to text first: in note taking, this is the end goal. Other times, the speech is processed directly, such as AI-based recognition that does not pass through a text layer.

But there's a problem. If the environment is noisy, the traditionally captured audio signal—the same one often used for voice recording or phone calling—may be too ambiguous or corrupted for the purposes of speech recognition. And what if the person speaking is in a place where she must remain silent, such as a meeting, conference, or performance?

To get a cleaner signal, the prior art today consists mostly of either advanced noise filtering technology applied to the output of a standard audio microphone to try to separate out the speech from the background noise, or in the case of teleconferences—an adjacent but different use—automated lipreading to help guide filtering or enhancement of the spoken audio. The former is of no use, of course, when the speaker must remain quiet, and in any event fails to use the wealth of other information available to devices beyond standard audio. And the latter is of no use unless the person happens to be in a room with a teleconferencing system, and even so, there's no integration with the personal speech recognition system, and so the technique is rather pointless. Note that a standard audio microphone is one that is designed to produce a reasonable and pleasant sounding facsimile of the audio that was in the room at the time, so that a listener in another place or at another time will recognize the sound with a limited and ideally minimal amount of distortion.

SUMMARY

In accordance with some embodiments, a method and system for detecting or inferring the words or phonemes a person is speaking or mouthing, using physically close techniques that supplement or replace an open microphone.

DETAILED DESCRIPTION

There are multiple ways to gain information about the words that a person is saying other than using an open microphone. Close applications—where the detector is placed near or touching the speaking person at the appropriate points—can assist or replace open microphone applications. Close applications can span from a close microphone, or a contact microphone, to motion capture, and even muscle movement or other neural impulses.

Figure 1:
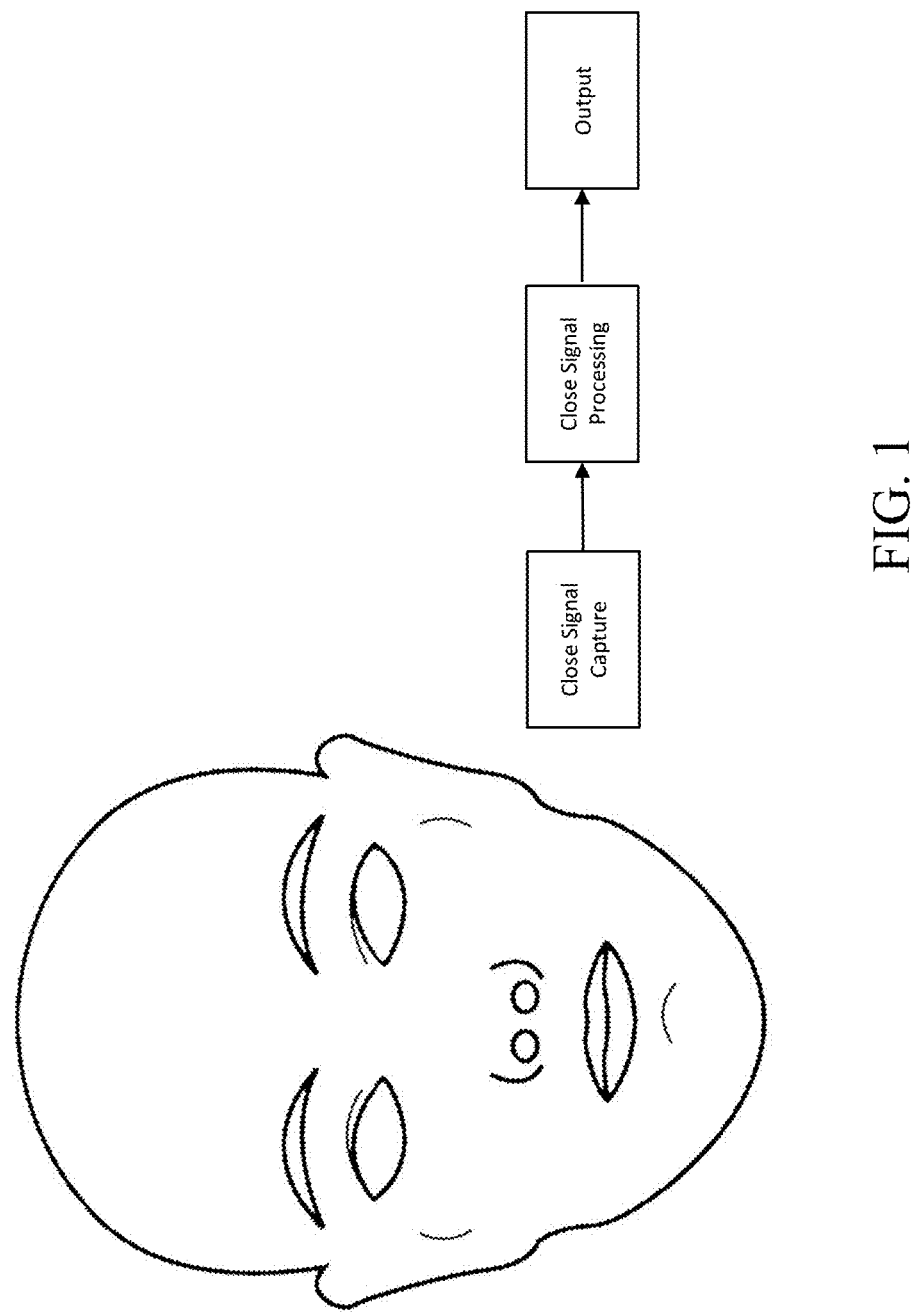
FIG. 1 is a diagram of an embodiment of the invention, showing the close signal capture and processing elements.

FIG. 1 is a functional diagram containing a head. Near the head is placed a Close Signal Capture. This element captures the close signal that contains speech information; such information is then relayed to a Close Signal Processing block for conversion into the desired output of the recognition.

Figure 2:
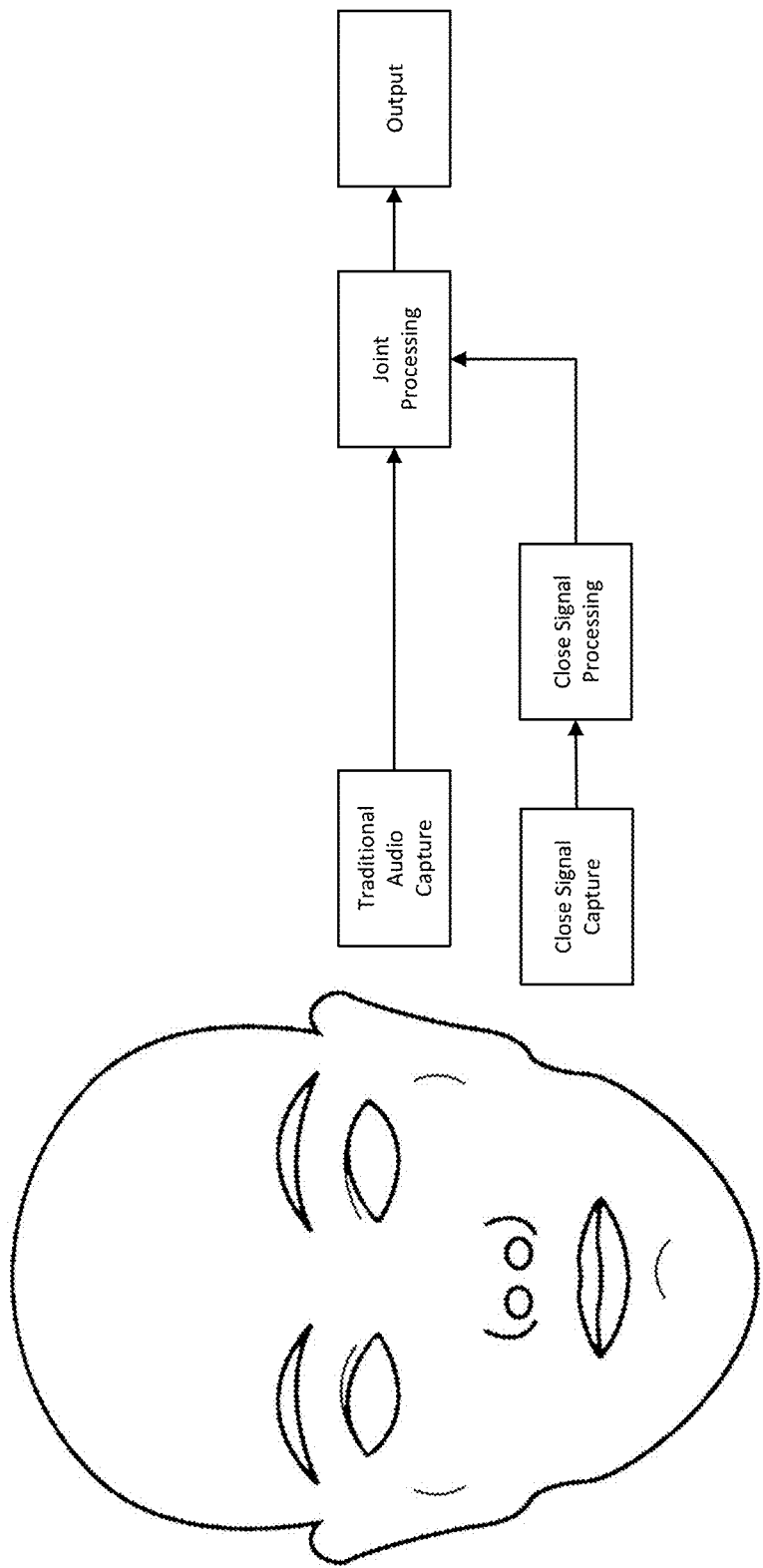
FIG. 2 is a diagram of an embodiment of the invention as applied to joint processing of traditional audio capture supplemented with close signal capture.

FIG. 2 shows an embodiment with joint processing. Joint processing uses the close signal capture and processed output, along with the traditional audio capture, to produce a joint output. Although the figure shows only one close signal capture and only one traditional audio capture, each should be understood as being one or more in number. The present invention need not be used as the primary or determinant speech recognizer. In one embodiment, another, standard audio recognizer is used alongside this invention. The output of this invention can be used to improve the standard speech recognizer's output: in one embodiment, the two outputs are compared and further processed to determine which one seems more likely. A further embodiment specifically uses a contextual and grammatical analyzer on the two outputs (typically, these are made of neural networks that have been trained on the language in use by the speaker as known in the art). Another embodiment uses the output of the present invention as inputs into the processing of the audio stream. The specific placement of the close capture device, and the type, can be varied, with each providing its own unique benefits, per this disclosure below.

Figure 3:
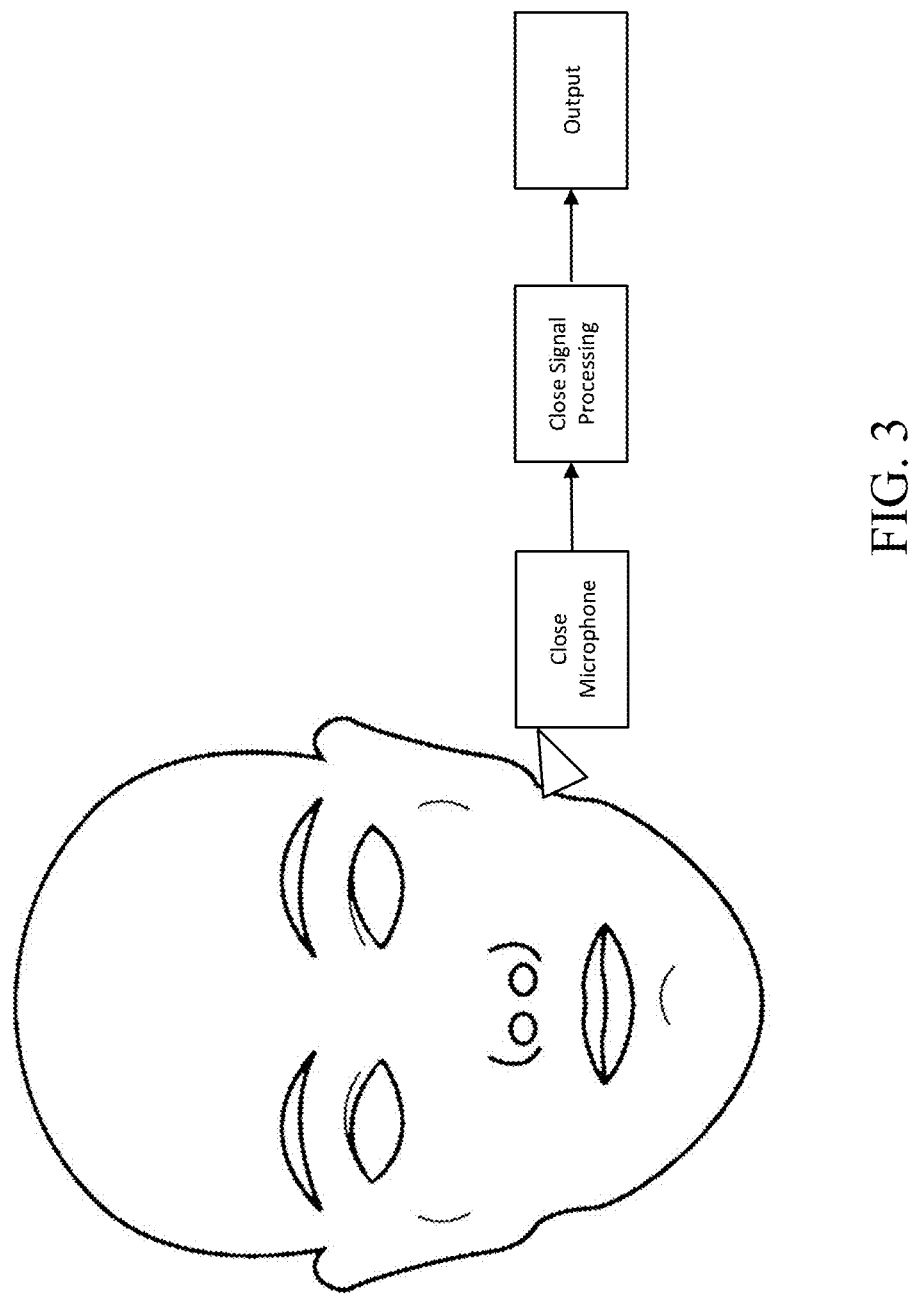
FIG. 3 is a diagram of an embodiment of the invention, showing a close microphone placed near the head.

FIG. 3 shows close microphone signal capture. The close microphone serves as the close signal capture. One embodiment uses a narrow-beamwidth directional microphone, placed near the ear of the speaker, and aimed inwards towards the head. Such a placement and beamwidth may allow the microphone to discriminate for sounds emanating from the speaker's head, by rejecting environmental noise. Such a microphone may be placed very close to the skin of the speaker—including up to in direct contact. When placed at the largest distances (1 cm or larger for a common narrow-beamwidth microphone, but the distance is often specific to the microphone), the microphone can capture the spillage of the sound waves directly from the speaker's mouth. One type of placement at this distance is to aim the microphone along the cheek, with the center of the microphone's axis aimed toward the mouth. An advantage of this aim is that the sound waves that are picked up are not distorted by cheek or bone, and thus are purer. Because this sort of placement may pick up environmental noise coming from the direction of the speaker, one employment mode is to further process the output in conjunction with other existing audio sources of the speaker, as disclosed below.

In an embodiment, the microphone is placed near the ear but aim the microphone towards the cheek or head, directly or at a glancing blow. This aim may significantly increase the environmental noise rejection. A possible consequence of this placement is that the speaker's voice may become distorted by the head of the speaker. Some embodiments use a standard head model (such a model encodes the channel conditions and thus distortions that a cheek and jowl create to vocal sounds emanating through the head) to improve the sound quality using electronic processing. One specific embodiment is to use the channel conditions from the standard model to derive using signal processing a likely original signal ("inverting the channel", or using the known or measured channel response to "undo" the channel's effects and arrive at the original conditions: these are usually linear transforms.). Such secondary signal is then sent to the processing block in one embodiment; another provides the signal as an output (be it sole or supplemental).

As the microphone is moved closer to the head, the distortions caused by the head to the sound may become greater, but the environmental noise is further reduced. The extreme is to place the microphone in contact with the head, as per some embodiments. There are a variety of contact microphones. A standard open-air microphone, encased in a small waveguide and placed near or directly on the head (such as cheek or cheekbone), can depending on the chosen part detect audio sufficiently well for this purpose: by dispensing with the need to reproduce the sound, the microphone can accept the distortions and use that for potentially greater processing accuracy. A piezoelectric phone—one that uses solid vibrations rather than radiated sound waves—has a different channel response than a standard open microphone, but is also able to gather the sound corresponding to the phonemes being uttered and may do so with more accuracy, even if the captured signal may be too distorted to be played back for another human to use. Depending on the placement, this sound may contain a bone transmitted component greater than the air component.

In some embodiments, an array of microphones is used. This array can be linearly placed, or each microphone can be placed at arbitrary positions. They may each be of different types. When using an array of microphones, it is possible to steer a jointly composed "beam" towards the desired location. This may be towards the mouth or cheek, or to any location measured to have the best correlation or produce the best output either alone (such as maximizing likelihood of the speech recognizer) or compared to or in conjunction with one or more standard audio streams. Besides beam steering (and specific noise rejection), an overall nearly maximal or optimal pattern can be produced, measured as stated above, without regard to pattern shape.

A possible advantage of close microphoning is that the speaker can whisper or speak very softly, and still allow the microphones the ability to pick up audio signals that are correlated with the words that have been spoken—even though that audio signal may not at all make an appropriate recording for another person to be able to comprehend (pleasantly or at all). In some embodiments, the audio of the motion of the muscles or bones may be sufficient for the wearer to not exercise his breathing at all, thus silencing a whisper completely. In an embodiment, the microphones used are phonomyographical, capturing the unique vibrations of the muscles, with processing as known to the art.

For most of these microphone placements, the microphone's own channel response curve can be used within the processing block for signal processing improvements, both with and without the standard head model.

Another technique is to use motion capture. Motion capture, in general, refers to using visual or sensor-based techniques to detect the motion of the person. The motion to capture here is that of the face—usually the cheek and mouth, depending on the position of the motion capture, especially for these close applications. One embodiment of motion capture is to use a close camera.

Figure 4:
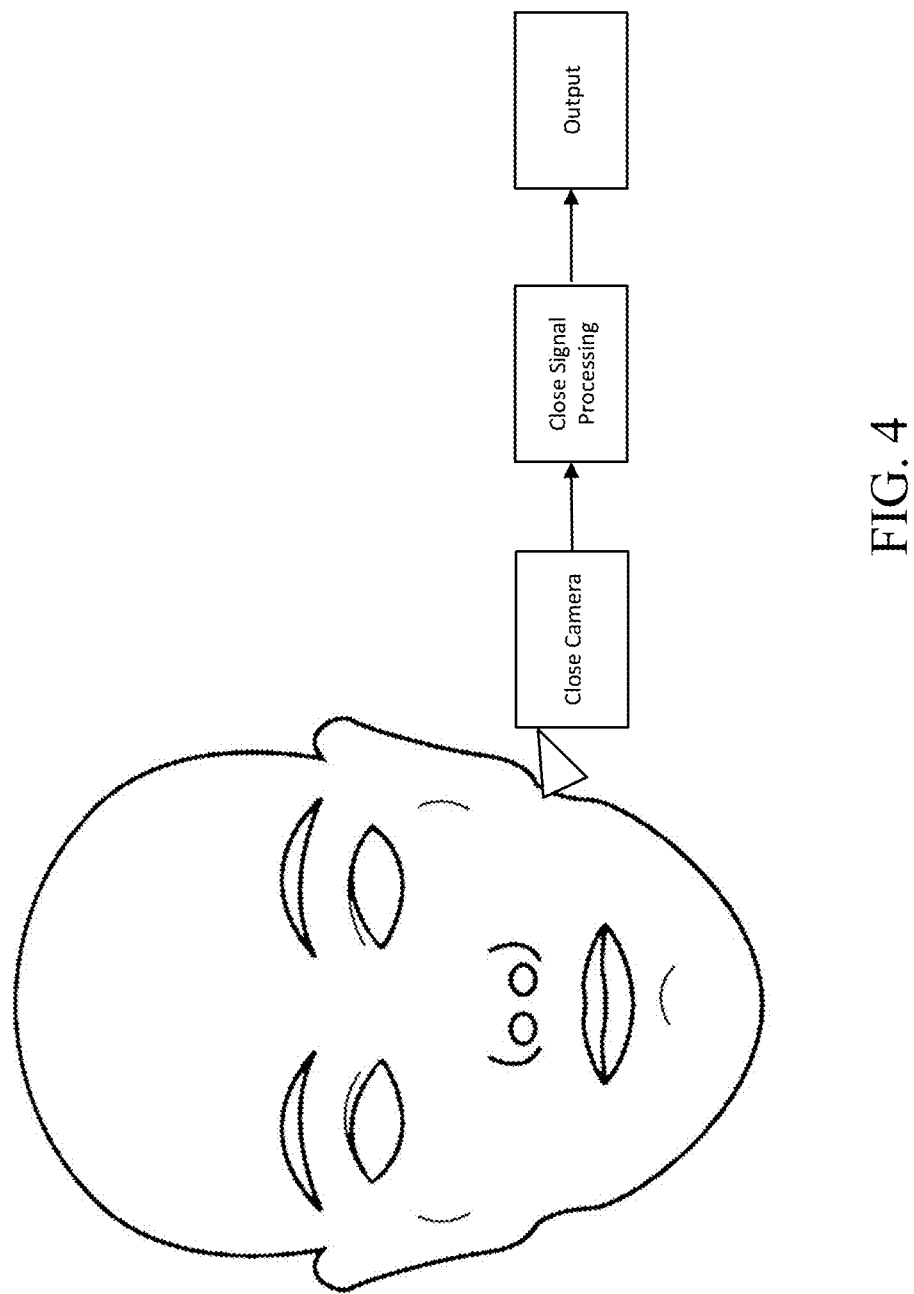
FIG. 4 is a diagram of an embodiment of the invention, showing a close-focusing camera placed near the head.

FIG. 4 shows a close camera embodiment. A close camera is a camera aimed at the head, or some part of it. Placement here too influences the types of signals that can be picked up. One embodiment is to use a visual camera—a camera that captures light visible to humans. A further embodiment places the camera near the ear or cheek and aims towards the cheek and mouth. This placement may ensure enough distance and field of vision to gather the lighting environment that the speaker is in, and thus may be able to use that light to produce the image. When appropriately aimed, the image gathered shows the motion of the cheek and/or jaw as the speaker is speaking, for use as described below. One embodiment uses a standard visible-light range camera with a near or macro lens. A further embodiment uses an infrared camera. One embodiment employs an artificial light source, such as an LED lamp placed in proximity to the camera, to light its field of view. This light may be visible light—most appropriate for cameras aimed directly at the body to avoid light spillage. Or the light may be only visible to the camera, such as ultraviolet or infrared light.

Another embodiment is to aim the camera directly at the head in close proximity. When the camera is aimed directly at the head, the distance to the camera may prevent natural light from reaching. Field of view narrowing can be overcome, if desired or needed by the signal processing employed, with a fisheye lens or equivalent. (This can be employed with all cameras, and not only with just this aim.) Light blocking issues can be overcome using the lighting embodiments as mentioned above. Infrared cameras can detect the natural thermic lighting coming off of the skin, and in that way may not need extra lighting. (Pure thermal images themselves often have no detail, but a camera sensitive to a wider infrared and near-infrared spectrum and see outside of the purely thermal zone and based in part on its positioning may be able to pick up additional information.) One simple embodiment is to use the same parts as in an optical mouse to pick up the motion of the cheek and/or jaw. (Optical mice often use non-visible lighting and a simple or complex "camera" to detect the motion of the object underneath the mouse.) Another embodiment is to use a specialized projector coupled with the receiving camera. One such specialized projector is a dot projector, which projects a pattern of dots onto the subject, thus creating the texture to be monitored for. The dot projector's pattern is altered by the subject in such a way that three-dimensional information can be derived. Another embodiment used multiple cameras to enable depth sensing through parallax.

Figure 5:
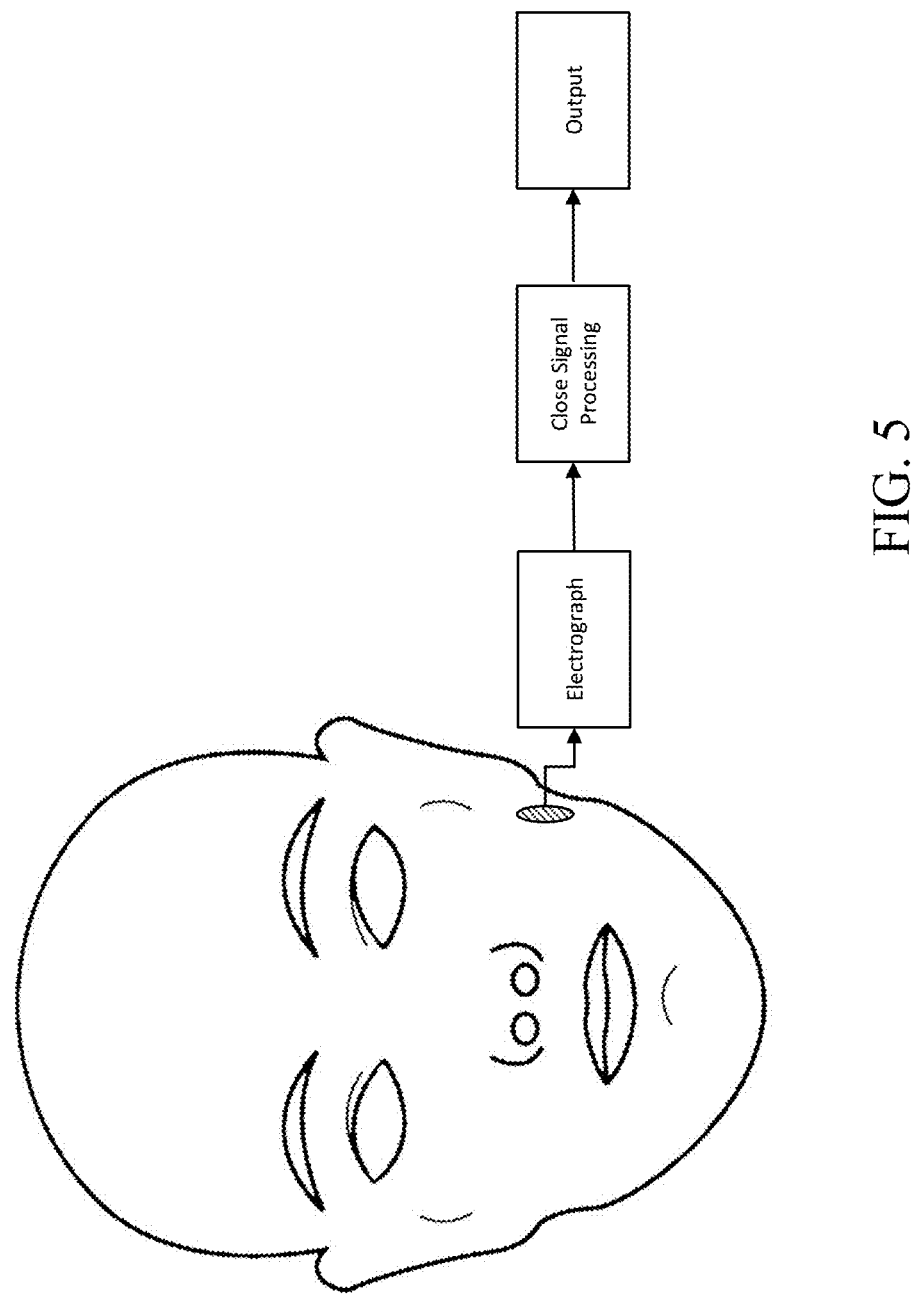
FIG. 5 is a diagram of an embodiment of the invention, showing a electrograph placed in contact with the head.

FIG. 5 shows the use of electrography. One or more electrographic sensors are applied. These may be applied to the skin directly. The familiar use of electography in medical settings can rely on one-time application of conductive thick gel, but these are not necessary for general use or at the fidelity levels required for this invention. The sensors detect slight voltage changes, such as the action potential correlated with muscle contraction. Many people who have had an electrocardiograph have experienced this procedure, using adhesive pads placed at various points along their chest and limbs to capture the signal produced by the beating of the heart. Electroencephalography similarly involves applying the pads to the head to measure brain waves. For our purposes, however, the more interesting signals are those from electromyography—detecting direct muscular contractions for the muscles under or near the probe. The probes need not be the medical stick on types. An embodiment uses a probe that lightly contacts the skin and is covered with a reusable conductive liquid or gel layer, such as a conductive polymer. This layer could be adhesive, such as similar to the reusable layer used for TENS pads, or nonadhesive. A different embodiment uses conductive nonstick coatings to prevent oxidation and to allow the electrical connection to be made without interfering items from sticking to the probe. The simplest embodiment is merely to use a conductive service, such as a small pad of metal, touching directly to the skin.

Once the close signal capture is established, the signal is processed. An additional set of embodiments uses a training exercise to partially or fully build up the close signal processing's understanding of what was said. One embodiment uses the explicit exercise of requesting the speaker to make a sound or exaggerated motion of a sound, so that the processing block can learn how the person's physiology matches the given sound. Another embodiment uses adaptive learning during opportunities where the user is speaking audibly enough to allow a traditional microphone to capture the spoken sounds: this embodiment then takes the captured sound or processed and derived output and drives the training algorithm present in the close signal processing block to adapt to the current physiology. A specific embodiment uses recognized speech from a standard audio recognizer to perform training on the learning mechanism of the present invention: a specific embodiment is to use that output in backpropagation through the neural network of the present invention's adaptive learning. This may be done intentionally during moments of low audio noise where the standard microphone captures audio sufficiently well; it may also be done opportunistically when such moments arise. Depending on the close signal capture type and placement, such adaptations can be relearned—this is especially important if the speaker changes positioning of the device (or it slides around). For the motion sensing close sensors, the information stream from a sensor might only carry part of the intended sounds (or motions that would have otherwise made a sound had the speaker not have been mouthing silently or whispering) cleanly. For example, tongue motion may be suppressed or difficult to directly determine. In these cases, the adaptive learning may provide added benefit in reducing ambiguity by revealing more subtle connections to the movement. The adaptive learning techniques are well understood to the art, and include using an adaptive neural network, including a deep neural network. One embodiment uses a joint neural network processing one or more traditional audio streams and one or more close sensors: a further embodiment uses a multilayer network where each input stream modality has its own or a smaller shared network before converging in higher layers.

A further set of embodiments involve applying the above in an earphone or earbud form factor. Although this invention in general does not need to be involved in earphones or earbuds, there may be some advantages in incorporating the present invention to a user who already wishes to use an earphone or an earbud. An earphone is usually on or over the ear, and involves a (typically soft) cup that is placed against the ear or around it and held in place with tension. In some of these embodiments, the close sensors are placed, one or more, on the phone assembly, the outside of the cup, the inside of the cup, or on the cup gasket which rests against the body, without limitation. In some embodiments, a camera is placed on the outside of the cup aiming towards the cheek and mouth. In some, a microphone is similarly placed. A camera may be placed inside the cup, aiming away from the ear. An electrographic probe—a small piece of conductive substance—may be placed on the gasket itself in an over-the-ear cup to make contact with the top of the cheek muscle. Each combination of the above—sensor, location on headphone—is an embodiment of this invention.

Figure 6:
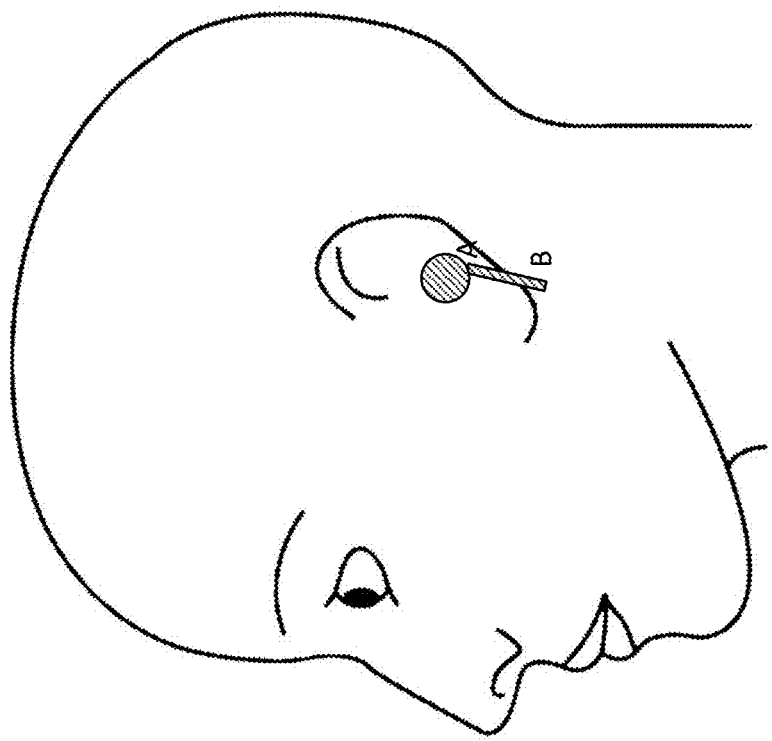
FIG. 6 is a diagram of referencing multiple embodiments of the invention, showing a physical layout with reference points A and B where close sensor locations are placed in embodiments.
Figure 6:
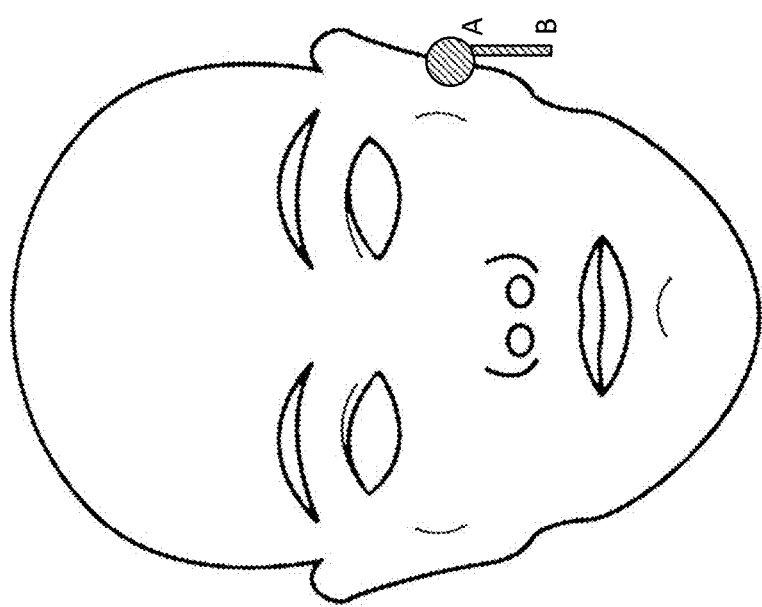

Similarly, this may be done for an earbud, which is a small device that is inserted into the ear, much like a hearing aid, and is usually held in place merely by the pressure of the ear canal bearing down on it once it is inserted. FIG. 6 depicts a forward and sideways view of embodiments of this invention in the form of earbuds, with a couple of positions called out for description. In one embodiment, the close sensor is built into the earpiece itself—the round part of the earbud in the photo above—and thus comes in contact with the ear. An electromyographic probe can pick up residual signals from cheek motion, as the ear and skin around the ear do not have muscles used by most humans. Another embodiment places the close sensor in a different part of the earbud than the earpiece itself. A specific embodiment places the sensor at point A: for example, a camera at point A may have a terrific field of view facing down the cheek and is a nearly ideal spot for a camera or close microphone. A different specific embodiment places it at point B: for example, a camera at point B has a more forward view than point A, and thus may see the outsides of the lips more clearly. If pointed directly towards the head, point B may have a view not obstructed by the earlobe, and thus may see the cheek and jaw more directly. In a different form factor than the earbud shown in the figure, point B may extend to directly contact the cheek. In that case, an electromyographic probe can make contact with the skin closer to the cheek muscles or other muscles to be observed.

Whether the invention is embodied in an earbud or other form factor, portable embodiments may allow the user to have easier access to silent or near-silent speech recognition or recognition in loud environments. The invention does not require that the close signal capture encode precisely mappable or discriminable "speech" information. For example, if there is ambiguity in the stream based on the mode of employment where mouth shapes are similar (p/b and t/d for voicing, s/sh for tongue shape), adaptive learning (or even just context) can often make heads or tails out of it. For example, such techniques are understood in the art of automated lip reading. Processing blocks based on multiple-possibility probability adaptation can retroactively update the posterior probabilities of ambiguous parts of the stream by surrounding (present or future) less ambiguous data. A detected stream that derives as "bodayduh" can be resolved as "potato" with nearly no necessary context, as there are few similar "shaped" words in the English language, such as when using motion or mouth shape detection from the visual or electrographic techniques described, so that even approximate pronunciation such as replacing the /oʊ/ sound at the end of the word with a schwa leaves little ambiguity. Multiple different close signal techniques together can help improve the accuracy of a given employment. And using syllable shape and sequence information through adaptive algorithms and probabilistic language tables are well known to the art.

Another embodiment employs recording the potential options of each morpheme recognized, to allow a user to go back and pick from those options which were the more likely recorded sounds, as would be useful in a self-dictation service where the speaker knows what he said, the need to capture the possibilities without certainty outweighs overall simplicity such as in a highly creative exercise that the person is engaging in, where preciseness matters and the risk of losing information is greater than the added complexity of storing and allowing manipulation of the alternatives.

Figure 7:
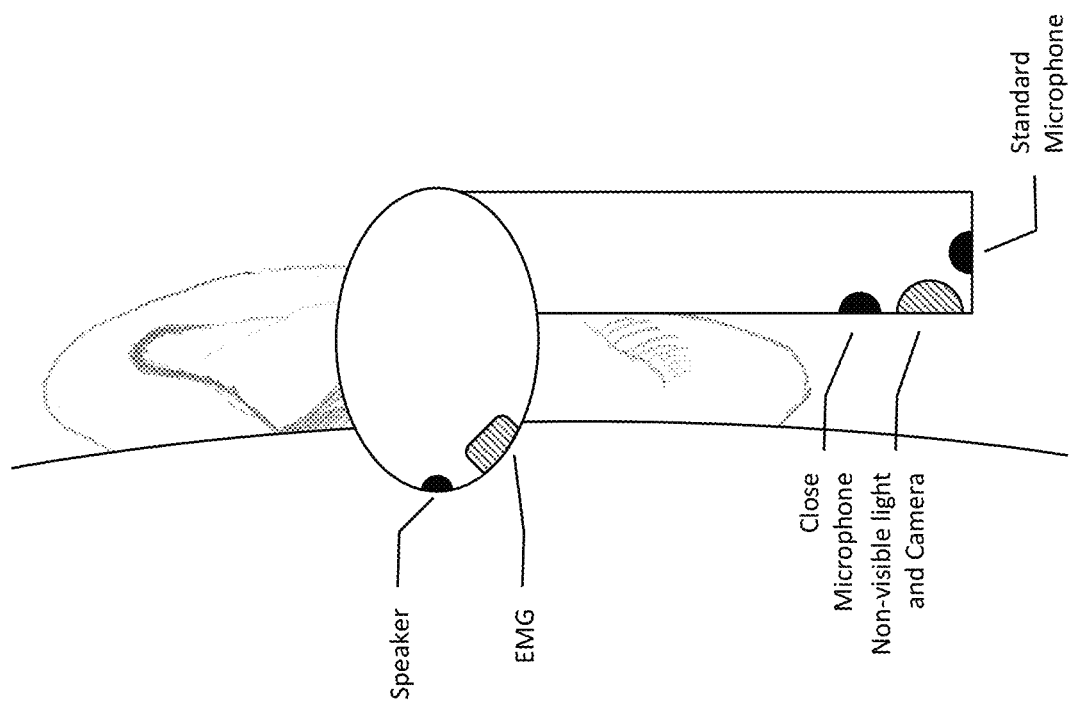
FIG. 7 is a diagram of an embodiment of the invention, showing a layout of an earbud possessing combined electromyographical, close audio, non-visible close camera, and standard audio detectors.

Some further embodiments combine the above methods. FIG. 7 shows the physical layout of a particular embodiment of a joint model combining multiple of the above processing techniques, manifested as an earbud. An earbud is inserted into the ear, and this particular embodiment has a stem hanging down. Within the earbud is a speaker, whose hole allows the sound to travel into the ear. (Not shown are the other holes necessary to provide proper airflow and resonance. Also not shown are batteries, the electronic circuitry, and noise cancelling technologies including microphones that are a part of the prior art.) Below the speaker hole is a conductive metal pad that is in contact with the outer ear canal and is where the electromyogram is produced from. At the bottom of the stem is the standard microphone, aiming downwards to capture the general voice produced by the speaker. This standard microphone is prior art and allows the capture of true phone quality or better audio, which the prior art uses for speech recognition but is not dispensed with here because it can allow the traditional audio channel. Next to the standard microphone, below the earlobe and facing the cheek, is a wide angle, broad spectrum camera and a non-visible LED floodlight for it: the same coupling as used in a night camera. The camera takes natural lighting, and if needed additional lighting is requested from the dimmable floodlight to help increase the quality, based on feedback from the processing algorithms upon discovering low confidence. Above it is a close microphone, aimed directly towards the cheek and, unlike the standard microphone, using a narrow audio field width to isolate out noise. (Note that this is not a limiting example, and the positions of the parts may be changed for manufacturing convenience, or as manifestations of the other embodiments mentioned above this section.)

Figure 8:
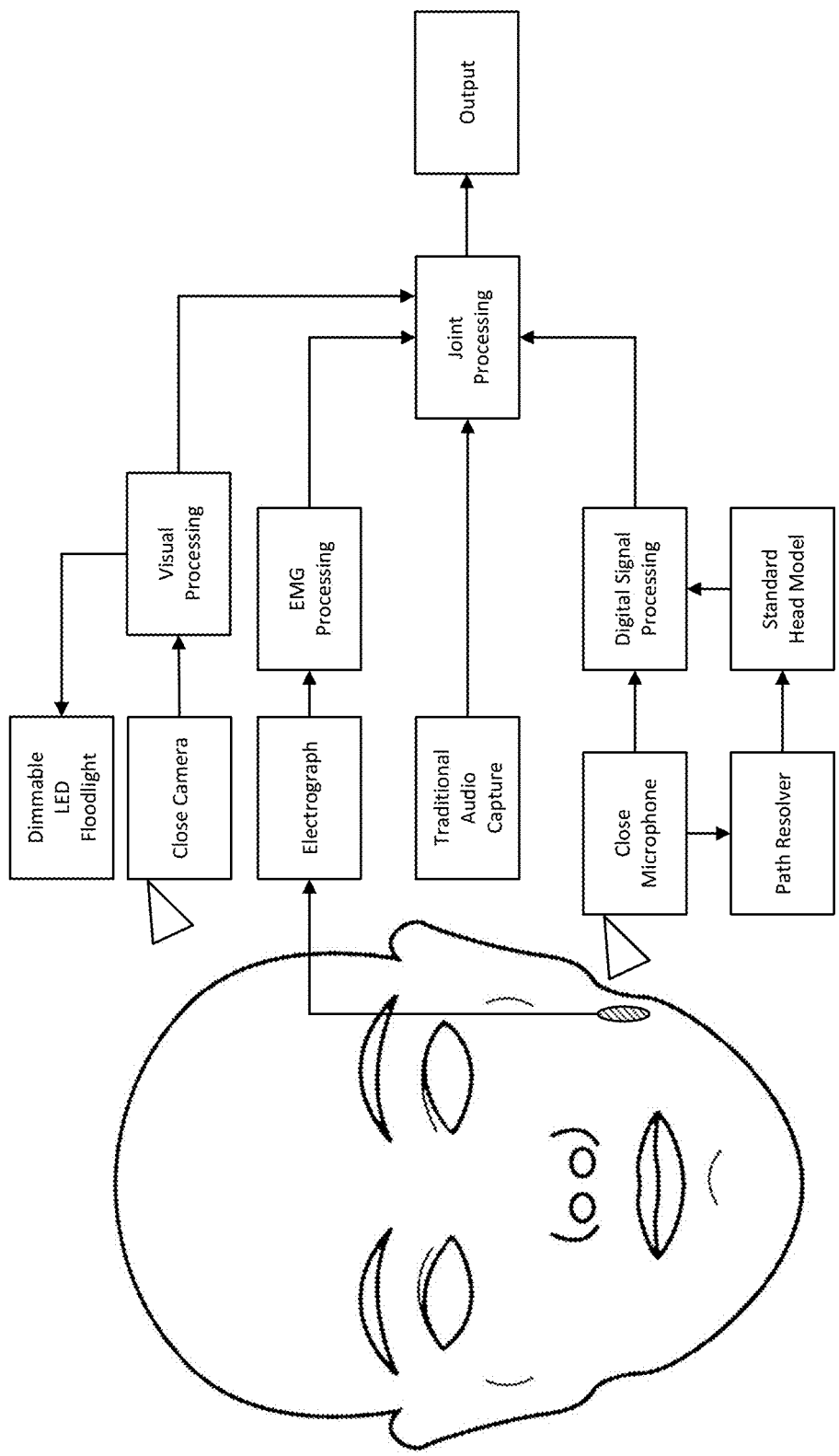
FIG. 8 is a diagram of an embodiment of the invention, showing the elements of a joint processing model such as that depicted in the joint earbud.

FIG. 8. shows a block diagram of this same embodiment. Only the input modes are shown: the speaker chain and the optional echo-filtering by output audio filtering from the speaker along the traditional and/or close microphone lines are not shown. The blocks correspond to what was mentioned for the previous filter. The joint processing block may be anything known to the art, but one embodiment is to use a deep multi-level adaptive neural network with a network for each channel to adapt each input for the higher layers, which also have been trained on the language in use by the speaker. The lower levels tend to capture the per-person per-position-of-earbud learning, and middle layers tend to mix those learnings from the different inputs. ("Tend" because it is extremely difficult to predict exactly what any given neural network has dedicated its neurons to do, as is the point of the art in this space.) Particularly useful multi-layer networks include using partial recurrence in the middle layers where the time-value comes in, with lower layers being optionally recurrent but focused more on adapting to channel conditions. The output is the recognized form. In one embodiment, it is a text string representing the words being spoken, with a clawback for replacing misunderstood words or letters as more input is collected.

Throughout this disclosure, multiple inventions are listed that are either separate or derived from other inventions in this disclosure. It is to be understood that the combinations and subprocesses of these inventions are also taught by this disclosure, as the combinations and subprocesses are able to be anticipated by those skilled in the art upon and only upon reading this disclosure. Furthermore, uses of the plural or the singular do not restrict the number of the item being mentioned: unless explicitly called out as not being so or being logically inconsistent, mentions of singular items are to be construed to also be plural and vice versa.

Throughout this disclosure, multiple alternative embodiments are listed. Each embodiment differs in tradeoffs or effects and as such is a best embodiment for that set of tradeoffs and effects. The choice of alternative to use depends on the tradeoffs or effects desired by an implementer skilled in the art, and such choice is obvious and straightforward within the art and requires no further invention or discovery. Conditional language such as "could", "can", and "may" are intended to refer to and are to be construed as referring to options (manufacture, configuration, or based on availability) within embodiments of the invention and do not state that additional invention is required. For example, the statement that "the invention can react to a given input" means that one configuration of one assembly of an embodiment of the present invention does indeed react to that input. This is done for linguistic economy only and does not suggest uncertainty or incompleteness as it relates to the invention being taught or otherwise. This disclosure does not speculate as to the future state of the art; it states a current invention. Examples are provided as explicit embodiments of the invention, as well as to elucidate the teaching.

This disclosure lists sufficient details to enable those skilled in the art to construct a system around or a technology using the novel methods of the contained inventions, without further discovery or invention.

I claim:

1. A method for collecting information related to the speech of a user comprising steps of:
   a. providing at least one close signal capture sensor located at least one of: on the head, and near the head of the person speaking,
   b. capturing signals from the close signal capture sensor,
   c. performing processing on the captured signal, and
   d. producing an output of the processing
   whereby said output may be used to guide the recognition of speech a joint processor that processes the signals from different close sensors; wherein the close sensors are placed in the form factor of a wearable device and the close sensors comprise at least one of: a close microphone, a close camera, and an electromyographic pad, wherein the form factor is at least one of: an earphone, and an earbud.

2. The method of claim 1 wherein at least one close signal capture sensor is a close microphone.

3. The method of claim 2 wherein the signal of the close microphone is processed using a model of the acoustics of the human head.

4. The method of claim 1 wherein at least close signal capture sensor detects phonomyographical information.

5. The method of claim 1 wherein at least one close signal capture sensor is a close camera.

6. The method of claim 1 wherein at least one close signal capture sensor is an electromyographic sensor.

7. The method of claim 1 comprising further steps of: performing joint processing of the signals from different close sensors.

8. The method of claim 1 wherein the processing learns by using speech recognition derived from traditionally reproducible audio to train the processing of at least one close sensor.

9. A system for collecting information related to the speech of a user comprising:
   a. at least one close signal capture sensor located at least one of: on the head, and near the head of the person speaking,
   b. a close signal capture that capturing signals from the close signal capture sensor,
   c. a processor that performs analysis on the captured signal, and
   d. an output of the processor
   whereby said output may be used to guide the recognition of speech a joint processor that processes the signals from different close sensors; wherein the close sensors are placed in the form factor of a wearable device and the close sensors comprise at least one of: a close microphone, a close camera, and an electromyographic pad, wherein the form factor is at least one of: an earphone, and an earbud.

10. The system of claim 9 wherein at least one close signal capture sensor is a close microphone.

11. The system of claim 10 wherein the signal of the close microphone is processed using a model of the acoustics of the human head.

12. The system of claim 9 wherein at least one close signal capture sensor detects phonomyographical information.

13. The system of claim 9 wherein at least one close signal capture sensor is a close camera.

14. The system of claim 9 wherein at least one close signal capture sensor is an electromyographic sensor.

15. The system of claim 9 wherein the processing learns by using speech recognition derived from traditionally reproducible audio to train the processing of at least one close sensor.

16. The system of claim 9 wherein one or more close sensors are placed in the form factor of a wearable device.

17. The system of claim 16 wherein the wearable device is at least one of: an earphone, and an earbud.

* * * * *